O. McC. CHAMBERLAIN.
Running Gears for Railway Cars.

No. 158,031.  Patented Dec. 22, 1874.

UNITED STATES PATENT OFFICE.

O. McCONNELL CHAMBERLAIN, OF NEW YORK, N. Y., ASSIGNOR TO HIMSELF AND LEHMAN H. MANDELBAUM, OF SAME PLACE.

IMPROVEMENT IN RUNNING-GEARS FOR RAILWAY-CARS.

Specification forming part of Letters Patent No. 158,031, dated December 22, 1874; application filed April 20, 1874.

*To all whom it may concern:*

Be it known that I, O. McCONNELL CHAMBERLAIN, of the city, county, and State of New York, have invented certain Improvements in Means for Transmitting Motion on Railways, of which the following is a specification:

This invention consists in positive means for communicating propelling action to, and simultaneously arresting the revolving motion of, the several wheels of the trucks or cars in a railway-train, or certain of them, whereby increased traction or a quicker stoppage and sundry other advantages are obtained.

The invention also consists in a certain combination of toothed wheels, pinions, chain-pulleys, and chains for transmitting or arresting the propelling power throughout, or by the several wheels of the cars or trucks in a train, or certain of them.

Figure 1:
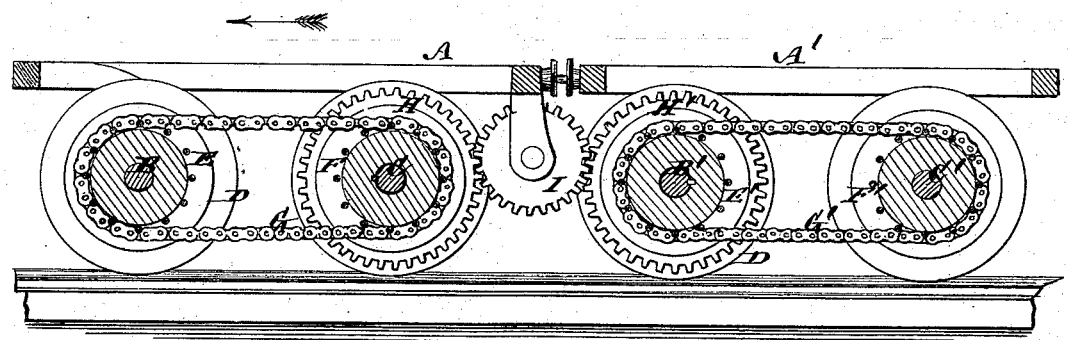
Figure 2:
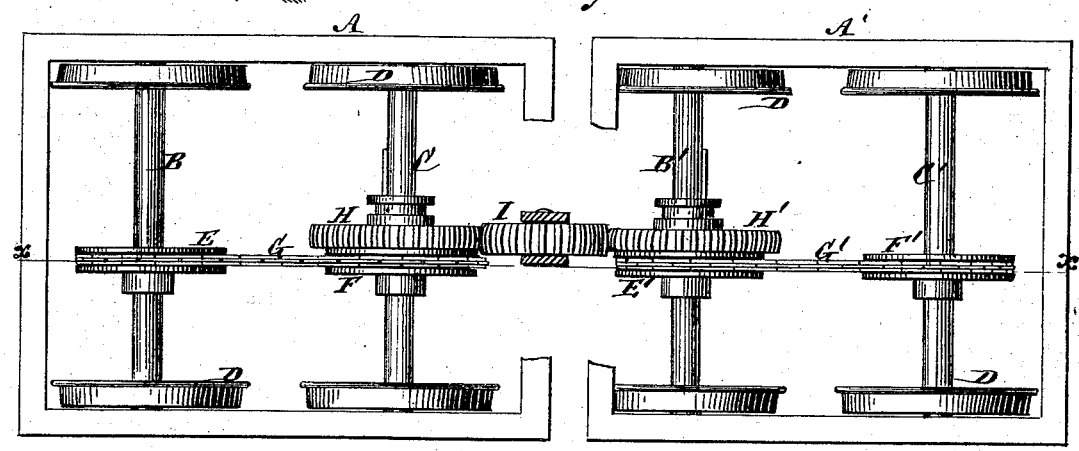

Figure 1 represents a longitudinal sectional elevation, on the line $x\,x$, of the adjacent front and rear trucks of two vehicles in a railroad-train with my invention applied; and Fig. 2, a plan of the same.

Supposing the train to be running in the direction of the arrow $y$, A is the rear, and A' the front, truck of two consecutive railway-cars or other vehicles with my invention applied. Fig. 2 is a plan of the same. B C and B' C' are the axles of said trucks, and D D the running-wheels thereof. E is a chain-pulley on the axle B of the truck A, to which axle motion may be communicated from the locomotive in the same manner as motion is communicated from the axles of one truck to the axles of another, and which, as represented in the drawing, is as follows: On the axle C of the same truck A is another chain-pulley, F, of the same diameter as the pulley E, and coupled therewith by a chain, G, for the purpose of making the one pulley the driver of the other. H is a spur-wheel on the shaft C, and which may be fast to the one side or face of the pulley F. This wheel gears with a pinion, I, which may be carried by the same truck A, and is here so shown, or may be an attachment to the adjacent truck, the same forming an intermediate connection, when the trucks A A' are united by the usual or any suitable couplings, for transmitting motion from the rear axle of the back truck of the one vehicle to the front axle of the forward truck of the next vehicle. To this end the pinion I also gears with a spur-wheel, H, on the axle B' of the truck A', and a pulley, E', on said axle transmits motion by a chain, G', to a pulley, F', on the axle C'.

This system of gearing may be extended throughout the whole train of vehicles, including the locomotive, thus giving increased traction or propelling power, and preventing grinding or wearing of the rails by the engine-wheels slipping or moving without producing traction, as is apt to be the case when the propelling power is confined to the locomotive.

Furthermore, by such system of propelling connection between the several vehicles of the train, brake-power applied to the engine-wheels, or to the wheels of any one vehicle in the train, will be communicated to all the wheels of the train. Thus all the wheels of the train move or stop in common. Likewise, when traveling round curves, each vehicle in the train is exerting a separate propelling power on its own particular part in the curve it is traveling over, and that tendency to draw it to one side by the pull of the engine, when not having its propelling power transmitted as described, is materially reduced or obviated. The means, too, shown for transmitting motion have a tendency to prevent the one car from riding on the other in case of collision or sudden stoppage.

The gear-wheels by which the propelling motion is transmitted may be fitted to slide laterally, for the purpose of breaking connection when required.

Instead of toothed gears, pulleys and chains may be used to transmit motion from the rear axle of one truck to the front axle of the next, duplicate pulleys capable of being thrown in or out of connection by a sliding clutch being arranged side by side, at a suitable distance apart, in the place occupied by the intermediate toothed wheel or pinion shown in the drawing.

I am aware that gear-wheels have been interposed between the front and rear axle of a single truck. Such, therefore, not being my invention, is disclaimed.

I claim—

1. The method of transmitting motion from the rear axle of one vehicle to the front axle of the adjacent vehicle by interposing between the said axles a gear-wheel, in the manner and for the object specified.

2. The combination, with the axles B C and B' C' of contiguous railway-trucks, of the chain-pulleys E F E' F', the chains G G', and the toothed gears H H' I, substantially as and for the purposes set forth.

O. M. CHAMBERLAIN.

Witnesses:
 HENRY T. BROWN,
 MICHAEL RYAN.